US011604286B2

(12) United States Patent
Srivastava et al.

(10) Patent No.: US 11,604,286 B2
(45) Date of Patent: Mar. 14, 2023

(54) GLOBAL NAVIGATION SATELLITE SYSTEM (GNSS) AND TEMPERATURE SENSING CRYSTAL (TSX) BASED DEVICE TIME SERVICE

(71) Applicant: Intel Corporation, Santa Clara, CA (US)

(72) Inventors: Aditya Srivastava, Fremont, CA (US); Ron Rotstein, Tel Aviv (IL); Balaji Subramanyam Natakala, Bangalore (IN); Sachin Kumar Prabodhkumar Vyas, Bangalore (IN); Mojtaba Bahrami, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 19 days.

(21) Appl. No.: 17/129,899

(22) Filed: Dec. 21, 2020

(65) Prior Publication Data

US 2022/0196848 A1 Jun. 23, 2022

(51) Int. Cl.
*G01S 19/39* (2010.01)
*G01S 19/07* (2010.01)
*G01S 19/42* (2010.01)

(52) U.S. Cl.
CPC .............. *G01S 19/39* (2013.01); *G01S 19/07* (2013.01); *G01S 19/42* (2013.01)

(58) Field of Classification Search
CPC ........... G01S 19/39; G01S 19/07; G01S 19/42
USPC .......................... 342/357.22, 357.25, 357.44
See application file for complete search history.

(56) References Cited

U.S. PATENT DOCUMENTS 6,150,980 A * 11/2000 Krasner ................ G01S 5/0036
342/357.29
6,662,107 B2 * 12/2003 Gronemeyer .......... G04C 10/04
342/358
7,084,810 B2 * 8/2006 Kitatani .................. G01S 19/34
342/357.62

(Continued)

FOREIGN PATENT DOCUMENTS

| EP | 3418819 A1 * | 12/2018 | ............. G04R 20/02 |
| WO | WO-2010075647 A1 * | 7/2010 | ............. G01S 19/23 |
| WO | WO-2019133151 A1 * | 7/2019 | ............. H04L 27/00 |

OTHER PUBLICATIONS

"European Application Serial No. 21198229.3, Extended European Search Report dated Mar. 18, 2022", 7 pgs.

*Primary Examiner* — Chuong P Nguyen
(74) *Attorney, Agent, or Firm* — Schwegman Lundberg & Woessner, P.A.

(57) ABSTRACT

In some implementations, a processor may retrieve predicted positioning data and predicted orbital data from global navigation satellite service (GNSS) positioning circuitry of a wireless device in response to a request for device time. The processor may retrieve long-term learning (LTL) data for a temperature sensing crystal (TSX) of the wireless device, the LTL data including S-curve characteristics of the TSX, and the time tracking uncertainty of the TSX. The processor may generate a GNSS-based device time estimate using the predicted positioning data and the predicted orbital data. The processor may perform TSX-based device time processing by updating the GNSS-based device time estimate using a clock signal of the TSX to generate a final device time estimate, the updating based on the retrieved LTL data for the TSX.

24 Claims, 7 Drawing Sheets

(56) References Cited

U.S. PATENT DOCUMENTS

| | | | |
|---|---|---|---|
| 7,456,782 B2* | 11/2008 | Wang | G01S 19/23 |
| | | | 342/357.65 |
| 7,598,909 B2 | 10/2009 | Mcburney et al. | |
| 7,924,104 B2* | 4/2011 | Huang | G04R 40/06 |
| | | | 331/65 |
| 8,188,917 B2 | 5/2012 | Gronemeyer et al. | |
| 8,378,889 B2* | 2/2013 | Yu | G01S 19/235 |
| | | | 342/357.62 |
| 2015/0025831 A1 | 1/2015 | Mourey et al. | |
| 2021/0392600 A1* | 12/2021 | Schmandt | H04W 56/0035 |

* cited by examiner

US 11,604,286 B2

GLOBAL NAVIGATION SATELLITE SYSTEM (GNSS) AND TEMPERATURE SENSING CRYSTAL (TSX) BASED DEVICE TIME SERVICE

TECHNICAL FIELD

Various embodiments generally may relate to the field of determining device time including Global Navigation Satellite System (GNSS) and temperature sensing crystal (TSX) based device time service.

BACKGROUND

With the increased popularity of wireless mobile devices and the use of different device applications, it is highly desirable to maintain a very accurate device time. This is especially important for Self-Organizing Networks and other applications where the network infrastructure may be associated with poor communication links and frequent device time updates from outside sources may be difficult to achieve.

BRIEF DESCRIPTION OF THE DRAWINGS

In the drawings, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
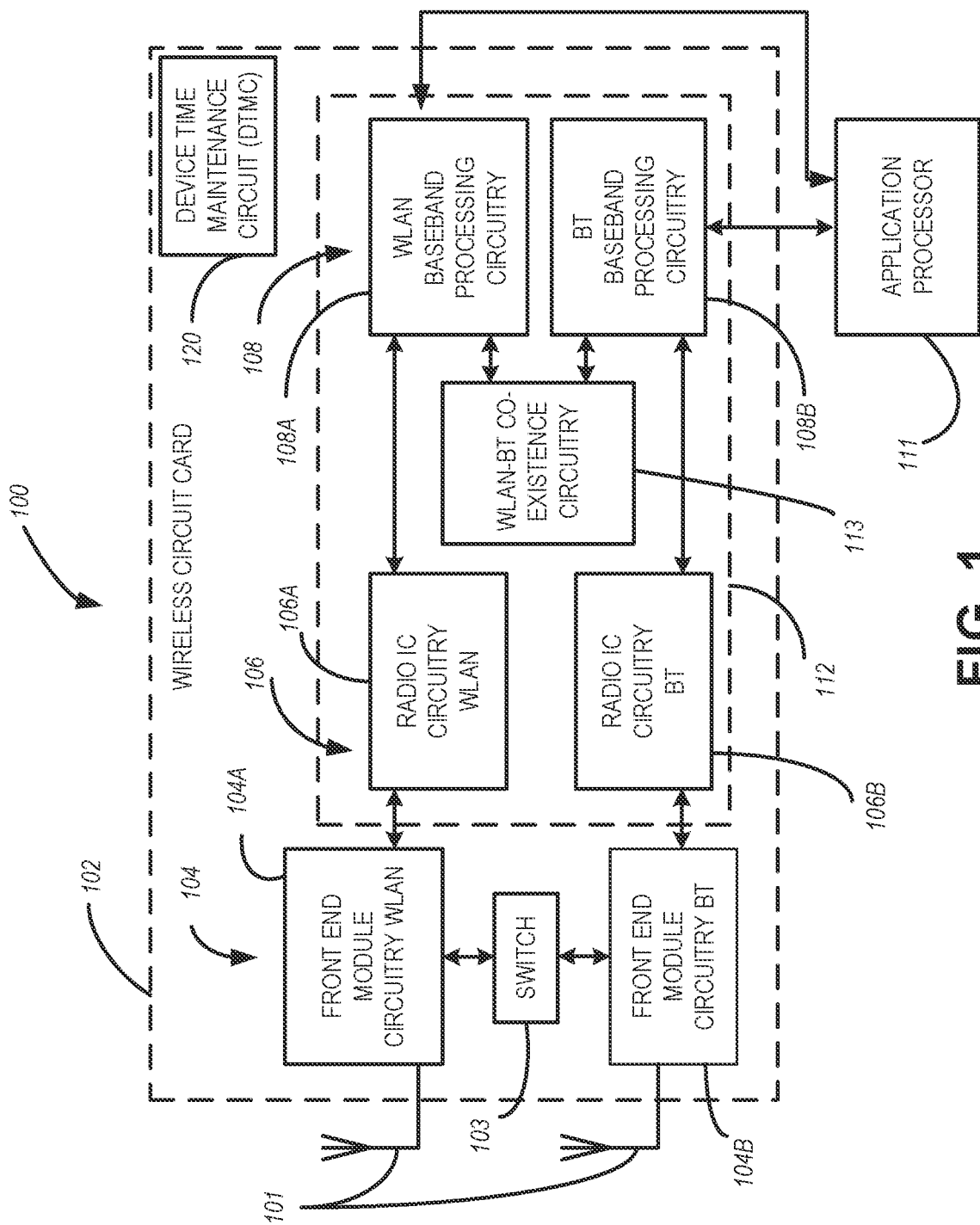
FIG. 1 is a block diagram of a radio architecture, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Techniques disclosed herein can be used to perform device time determination using a TSX-based time engine. A GNSS is recognized as a very accurate and trusted source of precise time, but to continuously run the GNSS positioning engine consumes a significant amount of energy which will drain a mobile battery within a short period (e.g., within a few hours). The GNSS positioning engine power consumption is prohibitively expensive on battery-powered devices and has so far prevented the use of GNSS as a continuous source of accurate device time.

In some aspects, a GNSS positioning engine may be configured in a lower power mode and duty cycle activation of the GNSS may be used to reduce effective power, or offload the GNSS positioning engine in a low power embedded domain. These solutions may reduce the effective power of GNSS by a factor of 3×, which is far from the preferred ~20× reduction for effective continuous operation of wireless devices. Additionally, the above GNSS-based methods require a stable clock source (e.g., a temperature-controlled crystal oscillator, or TCXO, or better) and a stable temperature environment, both of which may be difficult to achieve in modern portable devices.

Disclosed techniques for device time measurement and maintaining precise device time take advantage of a free-running clock with a temperature sensor, such as using a TSX-based device (e.g., a TSX-based time engine using a TSX for device time measurement) and an algorithm that can be executed in the background allowing the GNSS positioning engine and the high-frequency clocks to be turned off during extensive durations. In some aspects, time and time uncertainty may be maintained using primarily temperature measurements of the device and long term learning (LTL) data, including S-curve characteristics and time tracking uncertainty of the TSX in the TSX-based time engine (TBTE). Once time uncertainty reaches a maximum threshold, a low power domain GNSS-based solution (e.g., a GNSS-based time engine, or GBTE) is triggered. In some aspects, the GBTE uses simplified predictive satellite orbit and clock data correction. The activation of the GBTE in the low power domain (e.g., using an embedded processor such as a digital signal processor, or DSP) reduces the time uncertainty to the point where the TSX based algorithm of the TBTE can again take over to perform device time measurement so that the RF modules and the clock modules of the GNSS positioning engine (as well as the GBTE) are deactivated (or turned off) again. By using the TBTE for device time measurement, the device can be configured to operate for extended periods at low power consumption (e.g., below 1% of the power consumption of traditional methods using GNSS positioning). In some aspects, the communication and device time estimation performed by the GBTE and the TBTE can continue for a prolonged time interval (e.g., approximately 60 minutes) in a low power domain without the need to wake up the application processor-based full GNSS solution of the GNSS positioning engine, and hence achieve a couple of orders of reduction in power consumption in comparison to conventional techniques.

FIG. 1 is a block diagram of a radio architecture 100 in accordance with some embodiments. The radio architecture 100 may be implemented in a computing device including user equipment (UE), a base station (e.g., a next generation Node-B (gNB), enhanced Node-B (eNB)), a smartphone, or another type of wired or wireless device using synthesizer circuitry with frequency estimation. The radio architecture 100 may include radio front-end module (FEM) circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and to provide the amplified versions of the received signals to the WLAN radio IC circuitry 106A for further processing. The BT FEM circuitry 104B may include a receive signal path which may include circuitry configured to operate on BT RF signals received from the one or more antennas 101, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by the one or more antennas 101. Besides, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband processing circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and the baseband processing circuitry 108 may be provided on a wireless device such as wireless radio card 102. In some other embodiments, the one or more antennas 101, the FEM circuitry 104, and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC.

Figure 5:
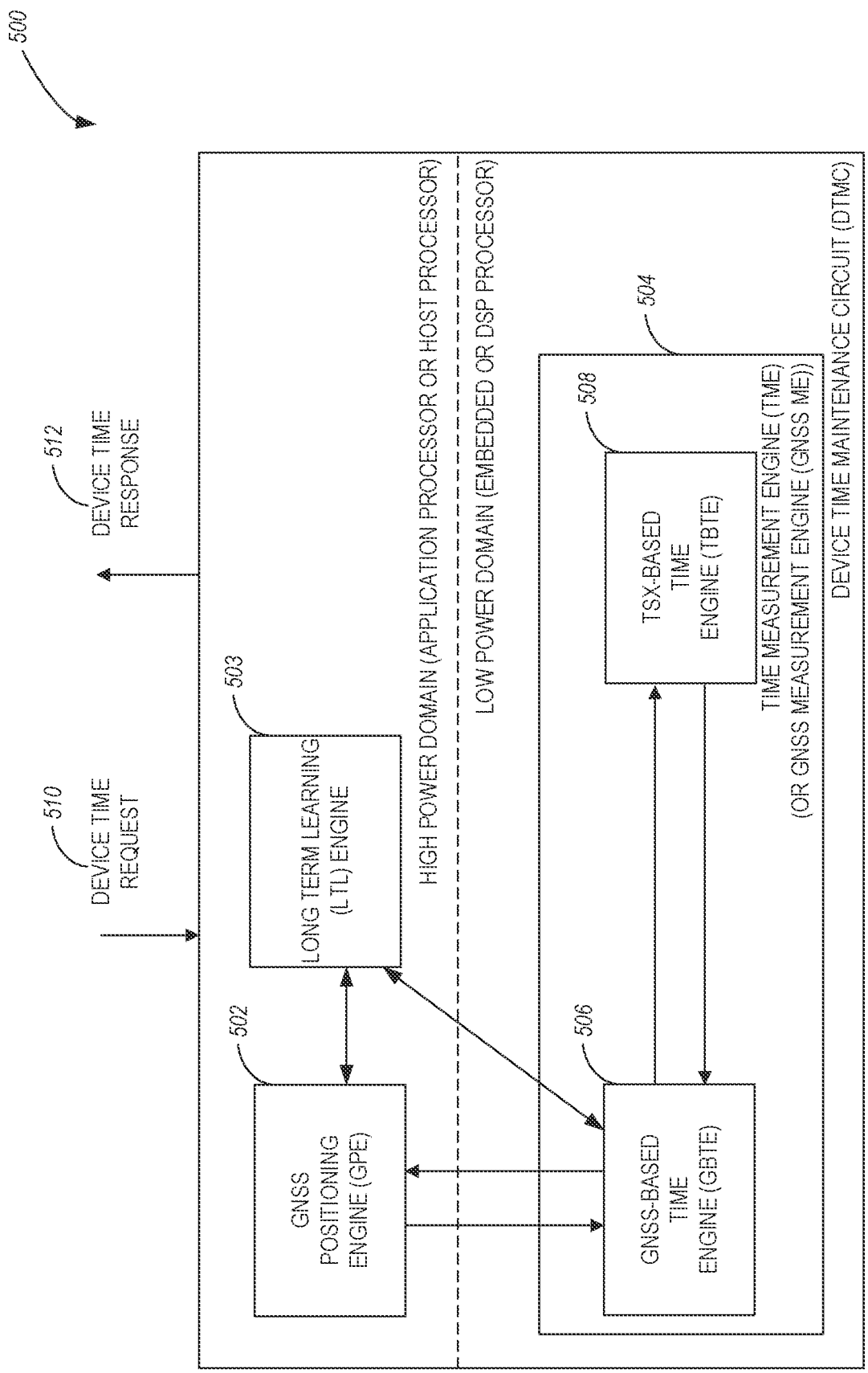
FIG. 5 illustrates a diagram of a device time maintenance circuit with a time measurement engine (TME) for determining device time, in accordance with some embodiments.

In some embodiments, the wireless radio card 102 further includes a device time maintenance circuit (DTMC) 120 configured to estimate and maintain device time, which can be used by oscillator circuits or other components and applications of the wireless radio card 102. A more detailed diagram of the DTMC 120 is illustrated in FIG. 5. Example techniques for device time estimation using a TSX are described in connection with FIG. 6 and FIG. 7.

In some of these multicarrier embodiments, radio architecture 100 may be part of a Wi-Fi communication station (STA) such as a wireless access point (AP), a base station, or a mobile device including a Wi-Fi enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards, including a $3^{rd}$ Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.11ax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the single wireless radio card 102, although embodiments are not so limited, and include within their scope discrete WLAN and BT radio cards In some embodiments, the radio architecture 100 may include other radio cards, such as a cellular radio card configured for cellular (e.g., 3GPP such as LTE, LTE-Advanced, or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
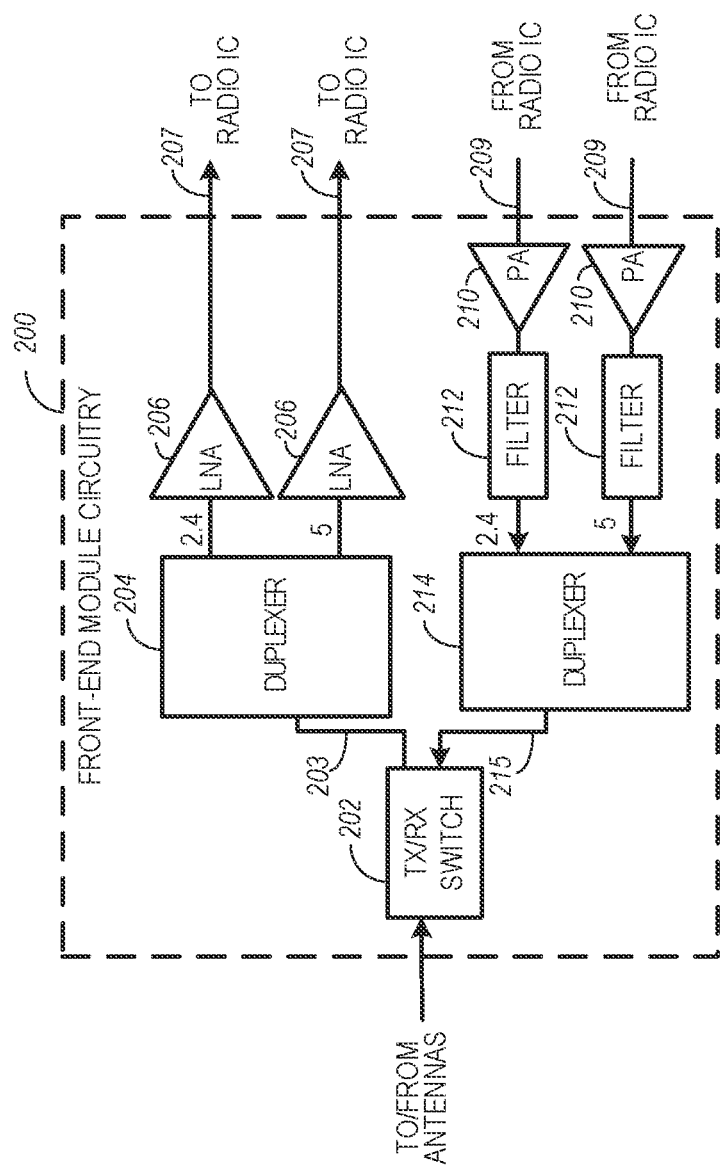
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

Figure 3:
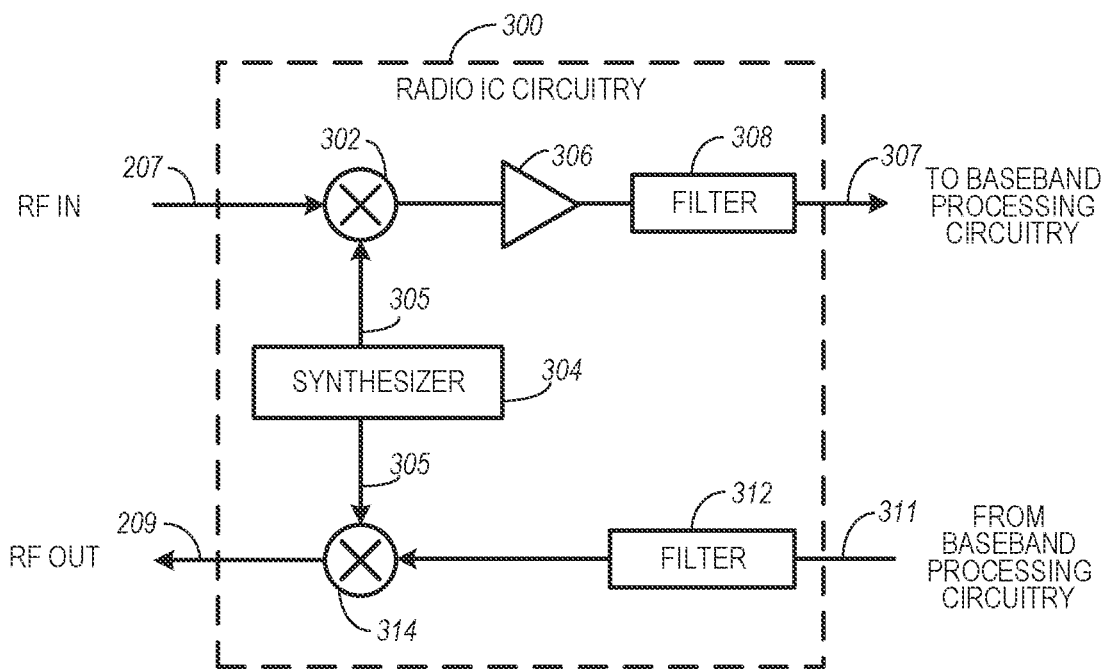
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (in FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (in FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (in FIG. 3) or to filter circuitry 308 (in FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (in FIG. 1) or the application processor 111 (in FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
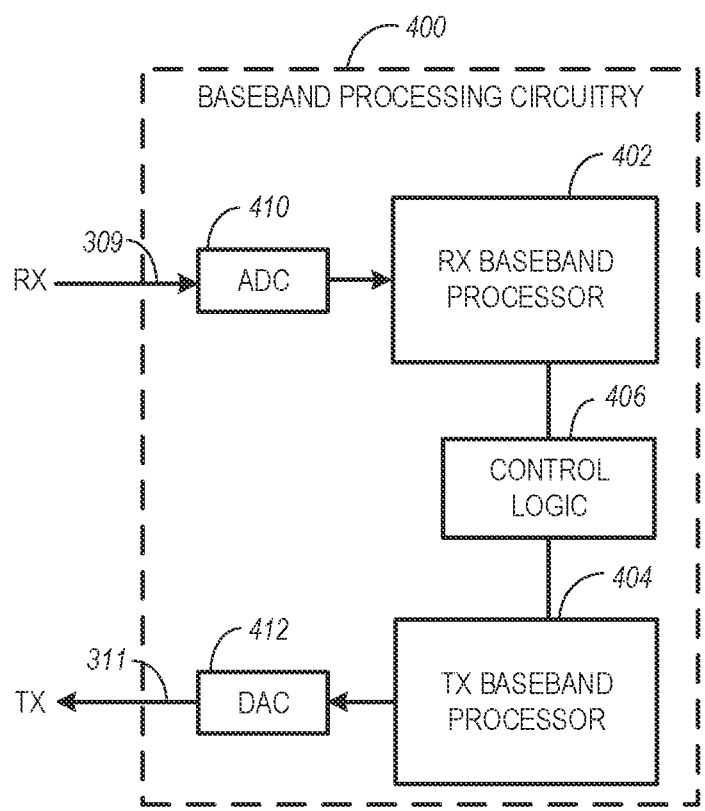
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (in FIG. 1), although other circuitry configurations may also be suitable. The baseband processing circuitry 400 may include a receive baseband processor (RX BBP) 402 for processing receive baseband signals 309 provided by the radio IC circuitry 106 (in FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through the baseband processing circuitry 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the one or more antennas 101 may each comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

FIG. 5 illustrates a diagram of a device time maintenance circuit (DTMC) with a time measurement engine (TME) for determining device time, in accordance with some embodiments. Referring to FIG. 5, the DTMC 500 is used within a wireless device and includes a GNSS positioning engine (GPE) 502 and a long-term learning (LTL) engine 503 configured in a high-power domain (e.g., using an application processor or a host processor of the DTMC 500), as well as a TME 504 configured in a low-power domain (e.g., using an embedded processor or a DSP).

In some aspects, the GPE 502 is also working as a time measurement engine. In some embodiments, TME 504 is not only providing time but GNSS measurements as well (the provided time can be considered as a byproduct of providing GNSS measurements). In this regard, TME 504 may also be referred to as GNSS ME 504.

The GPE 502 comprises suitable circuitry, logic, interfaces, and/or code and is configured to perform GNSS-based positioning functionalities including generating position, velocity, and time data associated with the wireless device, including predicted positioning data and predicted orbital data for a future period. The LTL engine 503 comprises suitable circuitry, logic, interfaces, and/or code and is configured to generate LTL data for a TSX used within the wireless device, such as a TSX used by the TBTE 508. In an example embodiment, the LTL data includes S-curve characteristics (e.g., including frequency versus temperature variations) and time tracking uncertainty of the TSX. LTL data learning can be mostly performed using time resolution performed by the GPE 502 as part of GNSS positioning.

As used herein, the term "time tracking uncertainty" indicates a predictive function that predicts the drift associated with temperature and frequency correction based on the S-curve characteristics. More specifically, the time tracking uncertainty is the drift associated with a time offset determined based on a change in frequency caused by changes in temperature (e.g., a change in temperature from a current temperature of x degrees to a temperature of (x+1) degrees).

In an example embodiment, the LTL data generated by the LTL engine 503 includes an LTL uncertainty table (LTLUT) which includes the expected uncertainty that builds up in the device time maintenance circuit 500 when the device time is tracked and maintained only by the TBTE 508 (e.g., device time tracked in a TSX-only mode as a function of temperature). The LTLUT may be used for estimating the uncertainty associated with TBTE 508 operation in TSX only mode based on variations of temperature.

In an example embodiment, the following functions can be performed in connection with generating LTL data by the LTL engine 503. The LTL engine 503 may initiate processing with a current Master LTL table (MasterLTL), which is a table reflecting the frequency offset of the TSX at a given temperature. The master LTL polynomial (MasterLTLpoly) is generated by applying a weighted polyfit function of the MasterLTL using the learning quality per table entry as the weights for the fit. In an example embodiment, a new LTL table is created, where the new offsets are the master LTL offsets+the uncertainty values derived from the learning quality of each table entry, as follows: LTL_Plus_Uncertainty=MasterLTL.offset+Uncertainty (MasterLTL.count). In an example embodiment, a 4th order polynomial of the new table that includes the uncertainties is generated as a weighted PolyFit (LTL_Plus_Uncertainty_poly) using the learning quality as weights. In an example embodiment, a new LTL table is generated where the offsets are the (for all bins) LTL_Plus_Uncertainty_Plus1deg (T)=LTL_Plus_Uncertainty_poly(T+1). In an example embodiment, a new LTL table is generated as follows: Uncertainty_Per_Degree=LTL_Plus_Uncertainty_Plus1deg- Master_LTL.offset. In an example embodiment, a 4th order Uncertainty_Deg polynomial is generated by the unweighted Ployfit(Uncertainty_Per_Degree). Such polynomial may be used as part of the LTL data as a polynomial providing the uncertainty per degree function.

The GBTE 506 comprises suitable circuitry, logic, interfaces, and/or code and is configured to perform low power device time estimation based on predicted positioning data and predicted orbital data from the GPE 502. The GBTE 506 is also configured to perform low power positioning and time estimation based on GNSS measurements with predicted positioning data and predicted orbital data as seed from GPE. The TBTE 508 comprises suitable circuitry, logic, interfaces, and/or code and is configured to use a TSX to continuously compute frequency changes based on detected changes in temperature based on S-curve characteristics. More specifically, the TBTE 508 may perform TSX-based device time processing initiated by a device time request 510 by detecting a change in temperature of the wireless device, determining a time offset corresponding to the change in temperature based on the S-curve characteristics of the TSX and generating the final device time estimate based on the determined time offset. The final device time estimate, which is provided in a device time response 512, may be periodically updated and provided as output after each update, while the GPE 502 is in a low power mode or powered off.

In operation, a device time request is received by the GPE 502. The GPE 502 communicates positioning data and predicted orbital data (e.g., for 60+ minutes in the future). The LTL engine 503 and communicates LTL data to the GBTE 506. The GBTE 506 may handoff device time maintenance to the TBTE 508 may switch to low power or sleep mode. The TBTE 508 maintains the device time for a specific time duration, e.g., until time tracking uncertainty of the TSX maxes out the GBTE 506 is woken up to take over device time estimate generation. At a predetermined time interval or when the time tracking uncertainty of the GBTE is above a threshold, the application processor and the GPE 502 are woken up so that the GPE can complete positioning session with updated predicted positioning data and predicted orbital data. A more detailed description of device time estimation using the TSX is provided in connection with FIG. 6 and FIG. 7.

Figure 6:
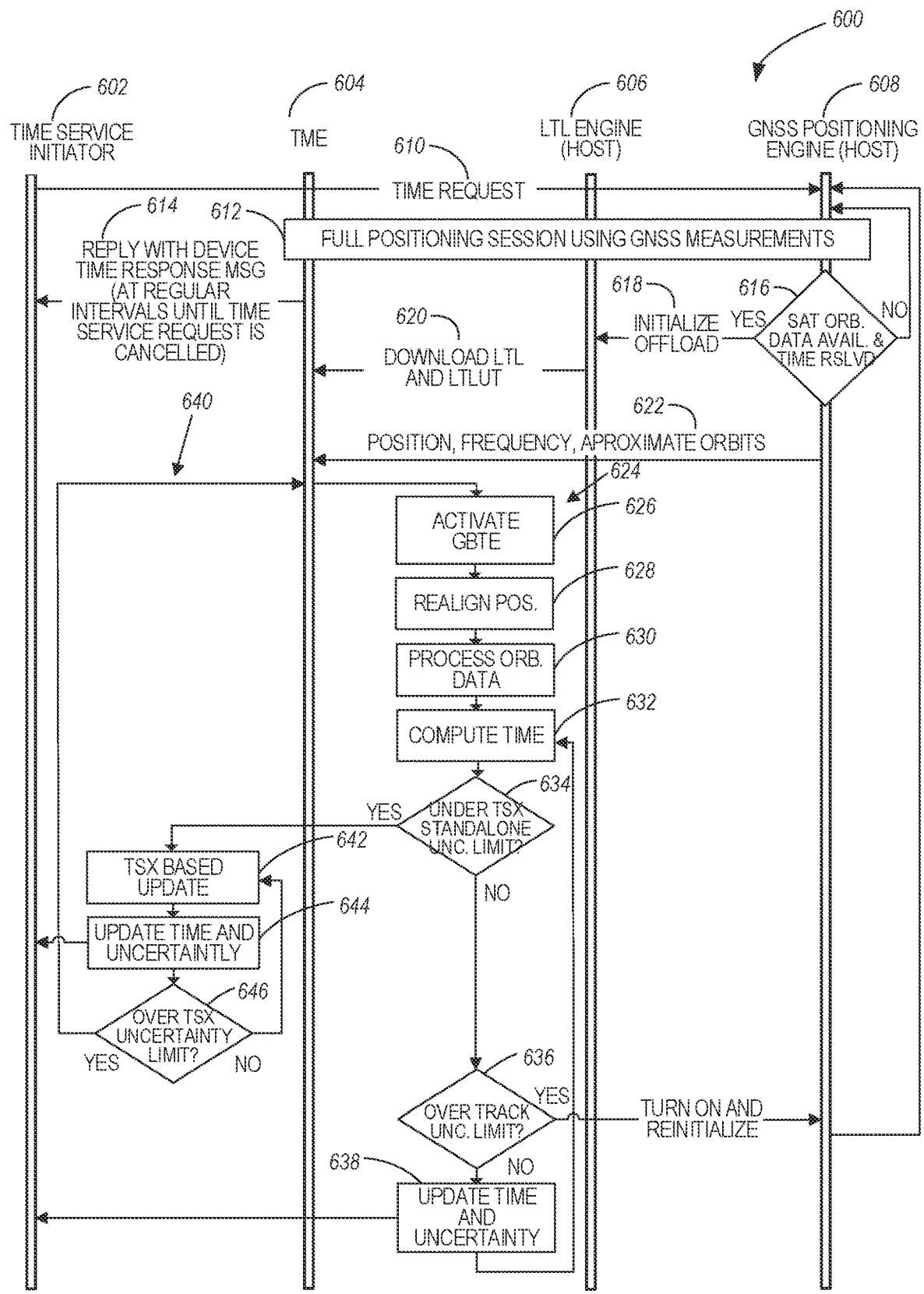
FIG. 6 illustrates a swimlane diagram of communication exchanges and processing within a wireless device associated with the disclosed techniques for determining device time, in accordance with some embodiments.

FIG. 6 illustrates a swimlane diagram 600 of communication exchanges and processing within a wireless device associated with the disclosed techniques for determining device time, in accordance with some embodiments. More specifically, the communication exchanges illustrated in FIG. 6 may take place between a time service initiator 602, TME 604 (which can be the same as TME 504 of FIG. 5), LTL engine 606 (which can be the same as LTL engine 503 of FIG. 5), and GNSS positioning engine 608 (which can be the same as the GNSS positioning engine 502 of FIG. 5). In an example embodiment, the TME can be a GNSS measurement engine performing the described functions of the TME.

Initially, the GPE 608 receives a device time request 610, which triggers a full positioning session 612 using GNSS measurements by the GPE 502. At operation 616, the GPE 608 determines whether satellite orbital data is available and whether device time is resolved based on the full positioning session 612. If the satellite orbital data is not available, the operation can resume the positioning session. If the satellite orbital data is available and the device time is resolved, orbital data and device time offload to the LTL engine 606 is initialized and performed. The LTL engine 606 can update LTL data based on the device time received from the GPE 608. At operation 620, LTL data including S-curve characteristics of the TSX in the TME 604 as well as time-tracking uncertainty of the TSX and LTL uncertainty tables (of the TSX and the GBTE within the TME 604) are downloaded by the TME 604. At operation 622, the TME 604 also retrieves predicted positioning data and predicted orbital data from the GPE 608. At operation 614, the TME 604 sent a reply message with a device time estimate (e.g., GNSS-based device time estimate generated using the predicted positioning data and the predicted orbital data retrieved from the GPE 608). In some aspects, the time resolution by the GPE can be considered as a continuous activity with varied time uncertainty, and this information is fed to the LTL engine in a continuous manner to keep learning TSX characteristics such as frequency versus time.

In an example embodiment, the TME 604 may perform low power estimation of device time using process 624 performed by the GBTE 506 as well as process 640 performs by the TBTE 508 using the TSX. The device time estimation within the TME 604 is performed while the GPE 502 and the LTL engine 503 are in low power mode or powered off.

Process 624 may start with operation 626 when the GBTE 506 is activated. At operation 628, GBTE realigns positioning data using the predicted positioning data received from the GPE 608. At operation 630, the GBTE processes orbital data using the predicted orbital data received from the GPE 608 as a seed along with GNSS measurements to resolve for time and position. At operation 632, the GBTE computes a GNSS-based device time estimate. At operation 634, the TME 604 determines whether a time tracking uncertainty of the TSX is below a first uncertainty threshold. If it is not below the first uncertainty threshold, processing continues at operation 636 one the TME 604 determines whether a time tracking uncertainty of the GBTE is above a second uncertainty threshold. If the time tracking uncertainty of the GBTE is above the second uncertainty threshold, the GPE 608 is turned on and reinitialized for another full positioning session 612. If the time tracking uncertainty of the GBTE is not above the second uncertainty threshold, at operation 638, the device time estimate and the time tracking uncertainty of the GBTE are updated, and the device time estimate is output as a response to the time service initiator 602, and continues with resolving time using predicted orbital data along with a new set of GNSS measurements.

If the time tracking uncertainty of the TSX is below the first uncertainty threshold, process 640 is initiated and a TSX-based update of the device time estimate is performed at operation 642. More specifically, the TBTE 508 performs an update (at operation 644) to the GNSS-based device time estimate using a clock signal and temperature updates of the TSX to generate a final device time estimate, where the update is based on the retrieved LTL data for the TSX. After the device time estimate is updated, the time tracking uncertainty of the TSX may be updated as well. At operation 646, the TBTE determines whether the time tracking uncertainty of the TSX remains below the first uncertainty threshold. If the time tracking uncertainty of the TSX remains below the first uncertainty threshold, the TBTE continues to perform periodic updates to the device time estimate and operations continue at operation 642. If the time tracking uncertainty of the TSX is above the first uncertainty threshold, process 640 switches to process 624, and device time estimation continues at operation 626.

In some embodiments, integrating the TSX only based device time estimation and time tracking uncertainty estimation with an embedded TBTE and a low power time tracking GNSS solution (e.g., GBTE using predicted orbital data) with a back and forth handoff between these components (e.g., as illustrated in FIG. 6) keeps the power cost of device time maintenance below any current device time estimation solution. Additionally, the GNSS solution (e.g., using the GPE 502) may be invoked when the TSX time tracking uncertainty is above the first threshold. Once device time is resolved with high accuracy by the GBTE, TSX-based device time estimation by the TBTE takes over and GPE and GBTE may be switched to low power mode or turned off. The back and forth process between device time estimation by the GBTE and the TBTE continues until the predicted orbital data expires (e.g., the predicted positioning data and the predicted orbital data from the GPE can last for 60+ minutes without waking up the application (or host) processor.

Figure 7:
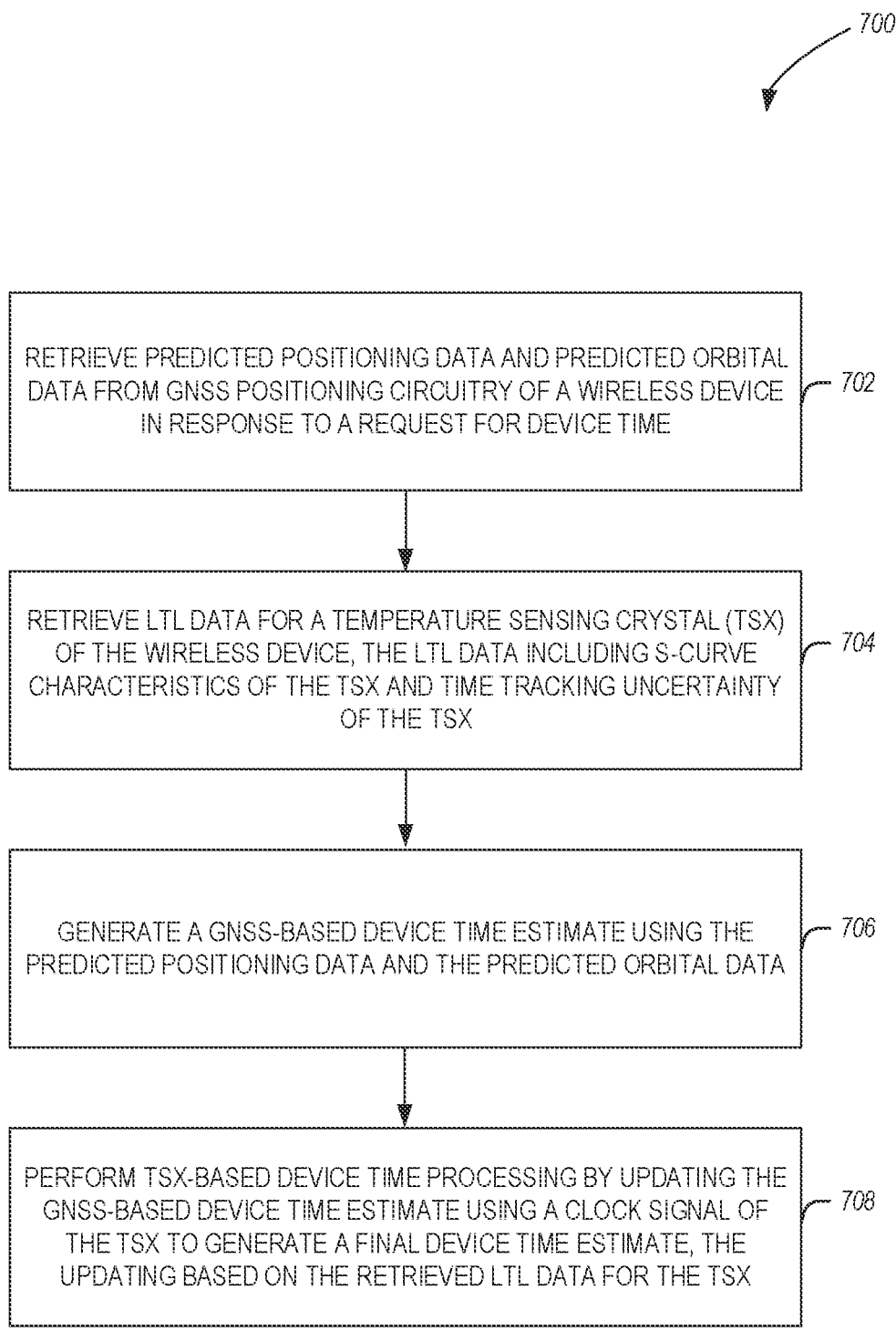
FIG. 7 is a flow diagram of a method for determining device time using a temperature sensing crystal (TSX), in accordance with some embodiments.

FIG. 7 is a flow diagram of method 700 for determining device time using a temperature sensing crystal (TSX), in accordance with some embodiments. Referring to FIG. 7, method 700 can be performed by, e.g., the TME 504 of FIG. 5. At operation 702, predicted positioning data and predicted orbital data is retrieved from global navigation satellite service (GNSS) positioning circuitry in response to a request for device time. For example, the GBTE 506 within the TME 504 retrieves predicted positioning data and predicted orbital data from the GPE 502 in response to the device time request 610 received from the time service initiator 602. At operation 704, long term learning (LTL) data for a temperature sensing crystal (TSX) of the wireless device is retrieved. For example, at operation 620, the TME 504 retrieves the LTL data from the LTL engine 503. The LTL data includes S-curve characteristics of the TSX of the TBTE 508 as well as the time-tracking uncertainty of the TSX. At operation 706, a GNSS-based device time estimate is generated using GNSS measurements with the predicted positioning data and the predicted orbital data as a seed. For example, the GNSS-based device time estimate is generated by the GBTE 506 during process 624 and FIG. 6. At operation 708, TSX-based device time processing is performed by updating the GNSS-based device time estimate using temperature updates and a clock signal of the TSX to generate a final device time estimate, the updating based on the retrieved LTL data for the TSX. For example, the TSX-based device time estimate update is performed by the TBTE 508 during process 640.

In some aspects, the performance of the TSX-based device time processing by the TME further includes powering off the GNSS positioning circuitry (e.g., GPE 502), detecting a change in temperature of the wireless device, determining a time offset corresponding to the change in temperature based on the S-curve characteristics of the TSX (used in the TBTE 508), and generating the final device time estimate further based on the determined time offset. In some embodiments, the TME 504 outputs the final device time estimate in response to the request and updates the time tracking uncertainty of the TSX based on the detected change in temperature. In some embodiments, the TME 504 periodically updates the final device time estimate using a subsequent clock signal of the TSX and the time tracking uncertainty, when the time tracking uncertainty of the TSX is below the first threshold. When the time tracking uncertainty of the TSX is above the first threshold, another GNSS-based device time estimate is generated (e.g., by the GBTE 506) using the predicted positioning data and the predicted orbital data. The GNSS-based device time estimate is updated using a subsequent clock signal of the TSX to generate an updated final device time estimate based on the retrieved LTL data.

In some embodiments, updating another GNSS-based device time estimate using the subsequent clock signal further includes updating a second time tracking uncertainty associated with the predicted positioning data and the predicted orbital data. The updated second time tracking uncertainty is compared with a second threshold (e.g., at operation 636). The TSX-based device time processing is performed when the updated second time tracking uncertainty is smaller than the second threshold. In some embodiments, the GPE is turned on and reinitialized. Updated predicted positioning data and predicted orbital data is retrieved from the GPE when the updated second time tracking uncertainty is higher than the second threshold, and the TSX-based device time processing is performed based on the updated predicted positioning data and predicted orbital data.

Figure 8:
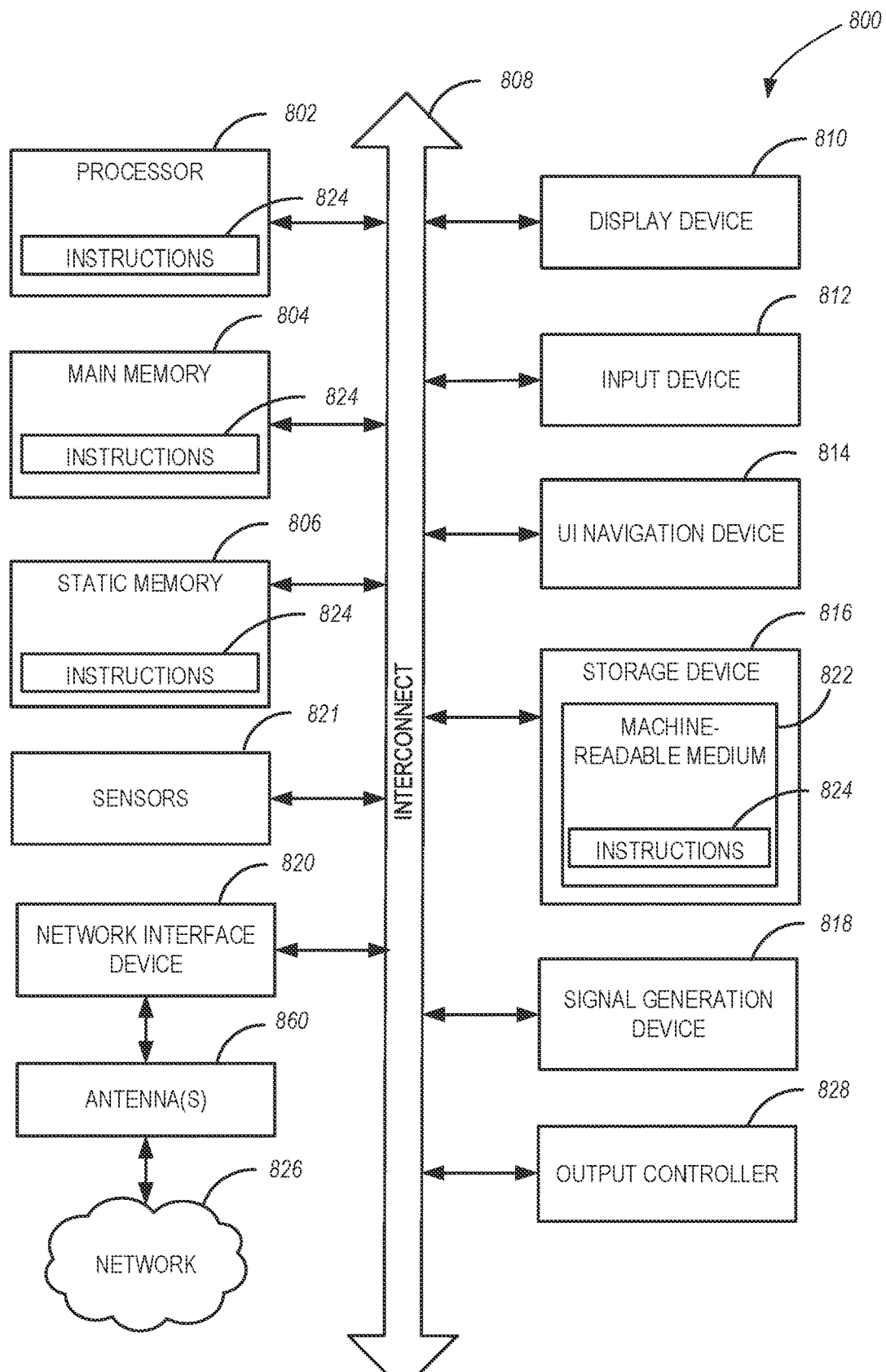
FIG. 8 illustrates a block diagram of an example machine upon which any one or more of the operations/techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, machine 800 may operate in the capacity of a server machine, a client machine, or both in server-client network environments. In an example, the machine 800 may act as a peer machine in a peer-to-peer (P2P) (or other distributed) network environment. The machine 800 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 800 may include a hardware processor 802 (e.g., a central processing unit (CPU), a graphics processing unit (GPU), a hardware processor core, or any combination thereof), a main memory 804, and a static memory 806, some or all of which may communicate with each other via an interlink (e.g., bus) 808.

Specific examples of main memory 804 include Random Access Memory (RAM), and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 800 may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a storage device (e.g., drive unit or another mass storage device) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 822 is illustrated as a single medium, the term "machine-readable medium" may include a single medium or multiple media (e.g., a centralized or distributed database, and/or associated caches and servers) configured to store one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, one or more sensors 821, a network interface device 820, antennas 860, a display device 810, an input device 812, a UI navigation device 814, a storage device 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding, or carrying instructions for execution by the machine 800, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media, optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

ADDITIONAL NOTES AND EXAMPLES

Example 1 is a wireless device comprising: global navigation satellite service (GNSS) positioning circuitry; and time measurement circuitry coupled to the GNSS positioning circuitry, the time measurement circuitry configured to retrieve predicted positioning data and predicted orbital data from the GNSS positioning circuitry in response to a request for device time; retrieve long term learning (LTL) data for a temperature sensing crystal (TSX) of the time measurement circuitry, the LTL data including S-curve characteristics of the TSX and time tracking uncertainty of the TSX; generate a GNSS-based device time estimate using the predicted positioning data and the predicted orbital data; and update the GNSS-based device time estimate using a clock signal of the TSX to generate a final device time estimate, the update based on the retrieved LTL data for the TSX.

In Example 2, the subject matter of Example 1 includes, wherein to perform TSX-based device time processing, the time measurement circuitry is further configured to detect a change in temperature of the wireless device; determine a time offset corresponding to the change in temperature based on the S-curve characteristics of the TSX, and generate the final device time estimate further based on the determined time offset.

In Example 3, the subject matter of Example 2 includes, wherein the time measurement circuitry is further configured to output the final device time estimate in response to the request; and update the time tracking uncertainty of the TSX based on the detected change in temperature.

In Example 4, the subject matter of Example 3 includes, wherein the time measurement circuitry is further configured to periodically update the final device time estimate using a subsequent clock signal of the TSX and the time tracking uncertainty when the time tracking uncertainty of the TSX is below a threshold.

In Example 5, the subject matter of Examples 3-4 includes, wherein when the time tracking uncertainty of the TSX is above a threshold, the time measurement circuitry is further configured to generate another GNSS-based device time estimate using the predicted positioning data and the predicted orbital data; and update another GNSS-based device time estimate using a subsequent clock signal of the TSX to generate an updated final device time estimate based on the retrieved LTL data.

In Example 6, the subject matter of Example 5 includes, wherein updating another GNSS-based device time estimate using the subsequent clock signal further includes updating a second time tracking uncertainty associated with the predicted positioning data and the predicted orbital data.

In Example 7, the subject matter of Example 6 includes, wherein the time measurement circuitry is further configured to compare the updated second time tracking uncertainty with a second threshold; and perform the TSX-based device time processing when the updated second time tracking uncertainty is smaller than the second threshold.

In Example 8, the subject matter of Example 7 includes, wherein the time measurement circuitry is further configured to retrieve updated predicted positioning data and predicted orbital data from the GNSS positioning circuitry when the updated second time tracking uncertainty is higher than the second threshold; and perform the TSX-based device time processing based on the updated predicted positioning data and predicted orbital data.

In Example 9, the subject matter of Examples 1-8 includes, wherein generating the GNSS-based device time estimate and the final device time estimate is performed while the GNSS positioning circuitry is powered off.

In Example 10, the subject matter of Examples 1-9 includes, wherein the time measurement circuitry further comprises: a low-power GNSS time engine configured to generate the GNSS-based device time estimate using the predicted positioning data and the predicted orbital data.

Example 11 is a method for generating a device time estimate of a wireless device, the method comprising: retrieving predicted positioning data and predicted orbital data from global navigation satellite service (GNSS) positioning circuitry in response to a request for device time; retrieving long term learning (LTL) data for a temperature sensing crystal (TSX) of the wireless device, the LTL data including S-curve characteristics of the TSX and time tracking uncertainty of the TSX; generating a GNSS-based device time estimate using the predicted positioning data and the predicted orbital data; and performing TSX-based device time processing by updating the GNSS-based device time estimate using a clock signal of the TSX to generate a final device time estimate, the updating based on the retrieved LTL data for the TSX.

In Example 12, the subject matter of Example 11 includes, wherein performing the TSX-based device time processing further comprises: powering off the GNSS positioning circuitry; detecting a change in temperature of the wireless device; determining a time offset corresponding to the change in temperature based on the S-curve characteristics of the TSX and generating the final device time estimate further based on the determined time offset.

In Example 13, the subject matter of Example 12 includes, outputting the final device time estimate in response to the request; and updating the time tracking uncertainty of the TSX based on the detected change in temperature.

In Example 14, the subject matter of Example 13 includes, periodically updating the final device time estimate using a subsequent clock signal of the TSX and the time tracking uncertainty, when the time tracking uncertainty of the TSX is below a threshold.

In Example 15, the subject matter of Examples 13-14 includes, wherein when the time tracking uncertainty of the TSX is above a threshold, the method further comprises: generating another GNSS-based device time estimate using the predicted positioning data and the predicted orbital data and updating another GNSS-based device time estimate using a subsequent clock signal of the TSX to generate an updated final device time estimate based on the retrieved LTL data.

In Example 16, the subject matter of Example 15 includes, wherein updating another GNSS-based device time estimate using the subsequent clock signal further comprises: updating a second time tracking uncertainty associated with the predicted positioning data and the predicted orbital data.

In Example 17, the subject matter of Example 16 includes, comparing the updated second time tracking uncertainty with a second threshold; and performing the TSX-based device time processing when the updated second time tracking uncertainty is smaller than the second threshold.

In Example 18, the subject matter of Example 17 includes, retrieving updated predicted positioning data and predicted orbital data from the GNSS positioning circuitry when the updated second time tracking uncertainty is higher than the second threshold; and performing the TSX-based device time processing based on the updated predicted positioning data and predicted orbital data.

Example 19 is a non-transitory computer-readable storage medium that stores instructions for execution by one or more processors of a wireless device, the instructions to cause the wireless device to perform operations comprising: retrieving predicted positioning data and predicted orbital data from global navigation satellite service (GNSS) positioning circuitry in response to a request for device time; retrieving long term learning (LTL) data for a temperature sensing crystal (TSX) of the wireless device, the LTL data including S-curve characteristics of the TSX and time tracking uncertainty of the TSX; generating a GNSS-based device time estimate using the predicted positioning data and the predicted orbital data; and performing TSX-based device time processing by updating the GNSS-based device time estimate using a clock signal of the TSX to generate a final device time estimate, the updating based on the retrieved LTL data for the TSX.

In Example 20, the subject matter of Example 19 includes, wherein executing the instructions for performing the TSX-based device time processing further causes the wireless device to perform operations comprising: powering off the GNSS positioning circuitry; detecting a change in temperature of the wireless device; determining a time offset corresponding to the change in temperature based on the S-curve characteristics of the TSX, and generating the final device time estimate further based on the determined time offset.

In Example 21, the subject matter of Example 20 includes, wherein executing the instructions further causes the wireless device to perform operations comprising: outputting the final device time estimate in response to the request, and updating the time tracking uncertainty of the TSX based on the detected change in temperature.

In Example 22, the subject matter of Example 21 includes, wherein executing the instructions further causes the wireless device to perform operations comprising: periodically updating the final device time estimate using a subsequent clock signal of the TSX and the time tracking uncertainty when the time tracking uncertainty of the TSX is below a threshold.

In Example 23, the subject matter of Examples 21-22 includes, wherein when the time tracking uncertainty of the TSX is above a threshold, executing the instructions further causes the wireless device to perform operations comprising: generating another GNSS-based device time estimate using the predicted positioning data and the predicted orbital data; updating another GNSS-based device time estimate using a subsequent clock signal of the TSX to generate an updated final device time estimate based on the retrieved LTL data, and updating a second time tracking uncertainty associated with the predicted positioning data and the predicted orbital data.

In Example 24, the subject matter of Example 23 includes, wherein executing the instructions further causes the wireless device to perform operations comprising: comparing the updated second time tracking uncertainty with a second threshold, and performing the TSX-based device time processing when the updated second time tracking uncertainty is smaller than the second threshold.

In Example 25, the subject matter of Example 24 includes, wherein executing the instructions further causes the wireless device to perform operations comprising: retrieving updated predicted positioning data and predicted orbital data from the GNSS positioning circuitry when the updated second time tracking uncertainty is higher than the second threshold; and performing the TSX-based device time processing based on the updated predicted positioning data and predicted orbital data.

Example 26 is at least one machine-readable medium including instructions that, when executed by processing circuitry, cause the processing circuitry to perform operations to implement any of Examples 1-25.

Example 27 is an apparatus comprising means to implement of any of Examples 1-25.

Example 28 is a system to implement of any of Examples 1-25.

Example 29 is a method to implement any of Examples 1-25.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A wireless device comprising:
    global navigation satellite service (GNSS) positioning circuitry; and
    time measurement circuitry coupled to the GNSS positioning circuitry, the time measurement circuitry configured to:
        retrieve predicted positioning data and predicted orbital data from the GNSS positioning circuitry in response to a request for device time;
        retrieve long term learning (LTL) data for a temperature sensing crystal (TSX) of the time measurement circuitry, the LTL data including S-curve characteristics of the TSX and time tracking uncertainty of the TSX; and
        while the GNSS positioning circuitry is powered off:
            generate a GNSS-based device time estimate using the predicted positioning data and the predicted orbital data; and
            update the GNSS-based device time estimate using a clock signal of the TSX to generate a final device time estimate, the update based on the retrieved LTL data for the TSX.

2. The wireless device of claim 1, wherein to perform TSX-based device time processing, the time measurement circuitry is further configured to:
    detect a change in temperature of the wireless device;
    determine a time offset corresponding to the change in temperature based on the S-curve characteristics of the TSX; and
    generate the final device time estimate further based on the determined time offset.

3. The wireless device of claim 2, wherein the time measurement circuitry is further configured to:
    output the final device time estimate in response to the request; and
    update the time tracking uncertainty of the TSX based on the detected change in temperature.

4. The wireless device of claim 3, wherein the time measurement circuitry is further configured to:
    periodically update the final device time estimate using a subsequent clock signal of the TSX and the time tracking uncertainty, when the time tracking uncertainty of the TSX is below a threshold.

5. The wireless device of claim 3, wherein when the time tracking uncertainty of the TSX is above a threshold, the time measurement circuitry is further configured to:
    generate another GNSS-based device time estimate using the predicted positioning data and the predicted orbital data; and
    update the another GNSS-based device time estimate using a subsequent clock signal of the TSX to generate an updated final device time estimate based on the retrieved LTL data.

6. The wireless device of claim 5, wherein updating the another GNSS-based device time estimate using the subsequent clock signal further includes updating a second time tracking uncertainty associated with the predicted positioning data and the predicted orbital data.

7. The wireless device of claim 6, wherein the time measurement circuitry is further configured to:
    compare the updated second time tracking uncertainty with a second threshold; and
    perform the TSX-based device time processing when the updated second time tracking uncertainty is smaller than the second threshold.

8. The wireless device of claim 7, wherein the time measurement circuitry is further configured to:
    retrieve updated predicted positioning data and predicted orbital data from the GNSS positioning circuitry when the updated second time tracking uncertainty is higher than the second threshold; and
    perform the TSX-based device time processing based on the updated predicted positioning data and predicted orbital data.

9. The wireless device of claim 1, wherein the time measurement circuitry further comprises:
a low-power GNSS time engine configured to generate the GNSS-based device time estimate using the predicted positioning data and the predicted orbital data.

10. A method for generating a device time estimate of a wireless device, the method comprising:
retrieving predicted positioning data and predicted orbital data from global navigation satellite service (GNSS) positioning circuitry in response to a request for device time;
retrieving long term learning (LTL) data for a temperature sensing crystal (TSX) of the wireless device, the LTL data including S-curve characteristics of the TSX and time tracking uncertainty of the TSX; and
while the GNSS positioning circuitry is powered off:
generating a GNSS-based device time estimate using the predicted positioning data and the predicted orbital data; and
performing TSX-based device time processing by updating the GNSS-based device time estimate using a clock signal of the TSX to generate a final device time estimate, the updating based on the retrieved LTL data for the TSX.

11. The method of claim 10, wherein performing the TSX-based device time processing further comprises:
detecting a change in temperature of the wireless device;
determining a time offset corresponding to the change in temperature based on the S-curve characteristics of the TSX; and
generating the final device time estimate further based on the determined time offset.

12. The method of claim 11, further comprising:
outputting the final device time estimate in response to the request; and
updating the time tracking uncertainty of the TSX based on the detected change in temperature.

13. The method of claim 12, further comprising:
periodically updating the final device time estimate using a subsequent clock signal of the TSX and the time tracking uncertainty, when the time tracking uncertainty of the TSX is below a threshold.

14. The method of claim 12, wherein when the time tracking uncertainty of the TSX is above a threshold, the method further comprises:
generating another GNSS-based device time estimate using the predicted positioning data and the predicted orbital data; and
updating the another GNSS-based device time estimate using a subsequent clock signal of the TSX to generate an updated final device time estimate based on the retrieved LTL data.

15. The method of claim 14, wherein updating the another GNSS-based device time estimate using the subsequent clock signal further comprises:
updating a second time tracking uncertainty associated with the predicted positioning data and the predicted orbital data.

16. The method of claim 15, further comprising:
comparing the updated second time tracking uncertainty with a second threshold; and
performing the TSX-based device time processing when the updated second time tracking uncertainty is smaller than the second threshold.

17. The method of claim 16, further comprising:
retrieving updated predicted positioning data and predicted orbital data from the GNSS positioning circuitry when the updated second time tracking uncertainty is higher than the second threshold; and
performing the TSX-based device time processing based on the updated predicted positioning data and predicted orbital data.

18. A non-transitory computer-readable storage medium that stores instructions for execution by one or more processors of a wireless device, the instructions to cause the wireless device to perform operations comprising:
retrieving predicted positioning data and predicted orbital data from global navigation satellite service (GNSS) positioning circuitry in response to a request for device time;
retrieving long term learning (LTL) data for a temperature sensing crystal (TSX) of the wireless device, the LTL data including S-curve characteristics of the TSX and time tracking uncertainty of the TSX; and
while the GNSS positioning circuitry is powered off:
generating a GNSS-based device time estimate using the predicted positioning data and the predicted orbital data; and
performing TSX-based device time processing by updating the GNSS-based device time estimate using a clock signal of the TSX to generate a final device time estimate, the updating based on the retrieved LTL data for the TSX.

19. The non-transitory computer-readable storage medium of claim 18, wherein executing the instructions for performing the TSX-based device time processing further causes the wireless device to perform operations comprising:
detecting a change in temperature of the wireless device;
determining a time offset corresponding to the change in temperature based on the S-curve characteristics of the TSX; and
generating the final device time estimate further based on the determined time offset.

20. The non-transitory computer-readable storage medium of claim 19, wherein executing the instructions further causes the wireless device to perform operations comprising:
outputting the final device time estimate in response to the request; and
updating the time tracking uncertainty of the TSX based on the detected change in temperature.

21. The non-transitory computer-readable storage medium of claim 20, wherein executing the instructions further causes the wireless device to perform operations comprising:
periodically updating the final device time estimate using a subsequent clock signal of the TSX and the time tracking uncertainty, when the time tracking uncertainty of the TSX is below a threshold.

22. The non-transitory computer-readable storage medium of claim 20, wherein when the time tracking uncertainty of the TSX is above a threshold, executing the instructions further causes the wireless device to perform operations comprising:
generating another GNSS-based device time estimate using the predicted positioning data and the predicted orbital data;
updating the another GNSS-based device time estimate using a subsequent clock signal of the TSX to generate an updated final device time estimate based on the retrieved LTL data; and updating a second time tracking uncertainty associated with the predicted positioning data and the predicted orbital data.

23. The non-transitory computer-readable storage medium of claim 22, wherein executing the instructions further causes the wireless device to perform operations comprising:

comparing the updated second time tracking uncertainty with a second threshold; and performing the TSX-based device time processing when the updated second time tracking uncertainty is smaller than the second threshold.

24. The non-transitory computer-readable storage medium of claim 23, wherein executing the instructions further causes the wireless device to perform operations comprising:

retrieving updated predicted positioning data and predicted orbital data from the GNSS positioning circuitry when the updated second time tracking uncertainty is higher than the second threshold; and performing the TSX-based device time processing based on the updated predicted positioning data and predicted orbital data.

\* \* \* \* \*